US010079935B1

(12) United States Patent
Flores et al.

(10) Patent No.: US 10,079,935 B1
(45) Date of Patent: Sep. 18, 2018

(54) MANAGING SENSITIVE INFORMATION TRANSFER BETWEEN PARTIES IN A TELEPHONE CONVERSATION

(71) Applicant: International Business Machines Corporation, Armonk, NY (US)

(72) Inventors: Romelia H. Flores, Keller, TX (US); Christian E. Loza, Denton, TX (US); Olivia G. Loza, Denton, TX (US); Tomyo G. Maeshiro, Denton, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 12 days.

(21) Appl. No.: 15/469,083

(22) Filed: Mar. 24, 2017

(51) Int. Cl.
*H04M 3/42* (2006.01)
*H04M 3/22* (2006.01)
*G10L 15/18* (2013.01)

(52) U.S. Cl.
CPC ......... *H04M 3/42153* (2013.01); *G10L 15/18* (2013.01); *H04M 3/2281* (2013.01); *H04M 2203/6009* (2013.01)

(58) Field of Classification Search
None
See application file for complete search history.

(56) References Cited

U.S. PATENT DOCUMENTS

| 6,862,343 | B1 | 3/2005 | Vacek et al. |
| 7,986,773 | B2 | 7/2011 | Kalahasti et al. |
| 8,275,115 | B1 | 9/2012 | Everingham et al. |
| 8,619,951 | B2 | 12/2013 | Johansen et al. |
| 8,683,547 | B2 | 3/2014 | Apparao et al. |
| 9,014,364 | B1 | 4/2015 | Koster et al. |
| 9,407,758 | B1 | 8/2016 | Pycko et al. |
| 9,787,835 | B1 * | 10/2017 | Pycko ................. H04M 3/5166 |
| 2008/0037719 | A1 | 2/2008 | Doren |
| 2013/0197912 | A1 * | 8/2013 | Hayakawa ............ G10L 17/005 704/246 |
| 2015/0281446 | A1 * | 10/2015 | Milstein ................ H04M 3/493 379/88.01 |

FOREIGN PATENT DOCUMENTS

| EP | 2924966 A1 | 9/2015 |
| JP | 2015219689 A | 12/2015 |

OTHER PUBLICATIONS

Anonymous, "Plum's Award-Winning Interactive Voice Response Technology Automates Calls with Ease.", 2017.

\* cited by examiner

*Primary Examiner* — Harry S Hong
(74) *Attorney, Agent, or Firm* — Garg Law Firm, PLLC; Rakesh Garg; Daniel R. Simek

(57) ABSTRACT

A communication device associated with a first party monitors a call between the first party and a second party. The communication device identifies a request for sensitive information from the second party during the call. The communication device determines whether the requested sensitive information matches sensitive information stored in an encrypted data store by determining whether a text representation of the requested sensitive information matches a text representation of the sensitive information stored in the encrypted data store. The communication device sends, responsive to determining that the requested for sensitive information matches the stored sensitive information, the requested sensitive information to the second party.

20 Claims, 6 Drawing Sheets

MANAGING SENSITIVE INFORMATION TRANSFER BETWEEN PARTIES IN A TELEPHONE CONVERSATION

TECHNICAL FIELD

The present invention relates generally to a method, system, and computer program product for providing sensitive information during a telephone conversation. More particularly, the present invention relates to a method, system, and computer program product for managing sensitive information transfer between parties in a telephone conversation.

BACKGROUND

Sensitive information is often requested and provided via voice-based telecommunications. Sensitive information may include any information that a user does not wish to become known expect by certain parties. Examples of sensitive information include, but are not limited to, credit card information, health insurance account information or health conditions. For example, a user may call a service provider, such as an insurance provider, and be requested by the insurance provider to provide identifying information such as a birth date during a call. In another example, a user may call a provider of a product and be requested by the provider to provide a credit card number. A "call" may be defined as any electronic telecommunication using any format of communication in which sensitive information can be transmitted. For example, a call may include a telephone call, a voice-over-IP (voIP) call, a teleconferencing call or a mobile telephone call. A provider may include a human, an application, or one or more machines. Similarly, a user or caller may include a human, an application, or one or more machines.

SUMMARY

The illustrative embodiments provide a method, system, and computer program product. An embodiment of a method includes monitoring, by a communication device associated with a first party, a call between the first party and a second party. The embodiment further includes identifying, by the communication device, a request for sensitive information from the second party during the call. The embodiment further includes determining whether the requested sensitive information matches sensitive information stored in an encrypted data store by determining whether a text representation of the requested sensitive information matches a text representation of the sensitive information stored in the encrypted data store. The embodiment further includes sending by the communication device, responsive to determining that the requested for sensitive information matches the stored sensitive information, the requested sensitive information to the second party.

An embodiment further includes determining whether the second party is authorized to receive the sensitive information based upon user preference information associated with the first party, wherein sending the requested sensitive information is further responsive to determining that the second party is authorized to receive the sensitive information.

In an embodiment, the identifying of the request includes identifying the request using natural language processing. In another embodiment, the identifying of the request includes converting the request from a voice form to a text form.

An embodiment further includes encrypting the requested sensitive information, and sending the encrypted sensitive information to the second party. Another embodiment further includes converting the requested sensitive information from a text form to a voice form, and sending the requested sensitive information to the second party in the voice form.

An embodiment further includes receiving sensitive information in a voice form from the first party, and storing the sensitive information in the encrypted data store. Another embodiment further includes receiving a selection of a type of sensitive information to be shared, and storing the selection of the type of sensitive information in the user preference information.

Another embodiment further includes receiving a selection of a party authorized to receive sensitive information, and storing the selection of the authorized party in the user preference information. Another embodiment further includes receiving a selection of a party authorized to receive updates of sensitive information, and sending updated sensitive information to the authorized party responsive to receiving an update of the sensitive information.

In an embodiment, the request for sensitive information includes a voice request. In an embodiment, the requested sensitive information includes one or more of text data, voice data, image data, and video data.

An embodiment includes a computer program product. The computer program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
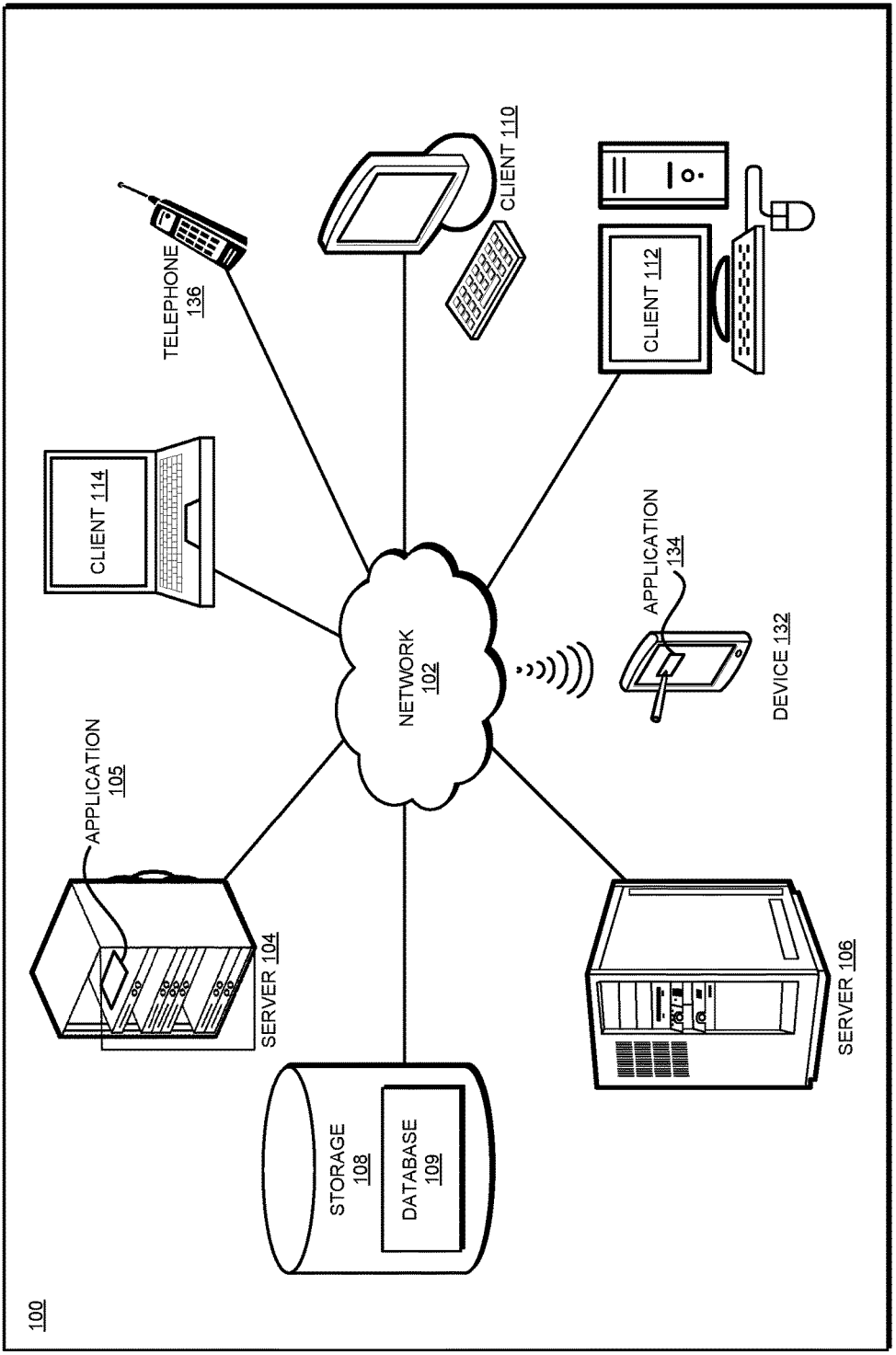
FIG. 1 depicts a block diagram of a network of data processing systems in which illustrative embodiments may be implemented.

The illustrative embodiments recognize that the presently available tools or solutions do not address these needs or provide adequate solutions for these needs. The illustrative embodiments used to describe the invention generally address and solve the above-described problems and other problems related to intelligent insertion of secondary content in live streaming.

An embodiment can be implemented as a software application. The application implementing an embodiment can be configured as a modification of an existing telecommunication transmission system, as a separate application that operates in conjunction with an existing telecommunication transmission system, a standalone application, or some combination thereof.

Particularly, some illustrative embodiments provide a method of managing sensitive information transfer between parties in a telephone conversation. In particular embodiments, the method addresses the issue of having to transfer sensitive information over the phone while speaking with a live or automated call agent offering a product or services. In one or more embodiments, a communication device, such as a smartphone, associated with the user executes an application to enable the managing of providing sensitive information during a telephone call as will be further described herein.

As the use of smartphones and other telecommunication technologies gain increasing popularity, the need to maintain security of sensitive information also increases. The illustrative embodiments recognize that transmitting sensitive information over a voice call is still a large concern not only because data is exposed on an unsecured call but also because the sensitive information is propagated over the air exposed to malicious listeners. Many product and service providers, such as those utilizing live call center agents require verbal authentication when the user or client contact them by phone.

The illustrative embodiments recognize that the verbalization of private information represents a security issue. In certain settings, not only private information may be conveyed, but other sensitive information such as credit card information, health insurance account information or health conditions may also need to be verbally confirmed by the client for the call center live agent to process the request. In other environments, such as a user interaction with a website, encrypted transmission of sensitive data is often used. However, the encryption of the human voice during a call between a user and an agent at a call center is not generally available.

Furthermore, some sensitive information required to be provided during a call may not immediately be available to the user or tracked by the user. A situation may exist that when the call is made the reachability of this information is out of the capability of the user at the present time and the call may need to be postponed or delayed until the information is obtained. In these cases, the call process normally needs to be started over again from the beginning if an alternative resolution cannot be found.

In one or more embodiments, sensitive information associated with a user, such as a credit card number, a Social Security number, a birth date, health history information, prescription information or other information that a user wishes to remain private, is stored in an encrypted database. In particular embodiments, the application identifies sensitive information from a user's voice during a phone call, converted from voice to text, and stored in a database within an encrypted store in association with the user. In particular embodiments, the sensitive information is identified from voice data using Natural Language Processing (NLP). For example, if the user speaks a number during the call that is recognized as being in a format associated with a credit card, the application identifies the number as a credit card number and stores the number in the database and identifies the number as being a credit card number.

At a subsequent time, such as during another phone call, a call center agent may verbally request the sensitive information during the call, the application recognizes the request, retrieves the sensitive information associated with request from the database, and provides the requested sensitive information to the call center agent. If the call center agent has the capability of receiving encrypted text information, such as if the call center agent is running the same or a similar application as the communication device associated with the user, the application sends the requested sensitive information to the call center agent in an encrypted text form. The application associated with the call center agent may then decrypt the sensitive information, and display the sensitive information to the call center agent.

If the call center agent does not have the capability of receiving encrypted text information, the application associated with the user communication device converts the sensitive information from a text form to a voice form, and speaks the sensitive information to the call center agent over the phone call.

In an example use case according to an embodiment, a user configures the application running on the user's communication device to indicate that the user is about to establish a call that the user would like to have the voice data of the call monitored in case sensitive questions are asked during a phone conversation. In particular embodiments, the application includes a user preferences component to allow the user to configure particular phone numbers. In one or more embodiments, the application detects if the user configured phone numbers are being called and initiates monitoring of the call for sensitive information during the call.

In particular embodiments, the user can further configure the application to detect particular keywords during the conversation that are associated with sensitive information such as "credit card", "account balance", etc. In particular embodiments, the user can configure the application to further augment the keywords being listened for during a phone conversation. In one or more embodiments, the user can configure if and how the user wishes to be prompted by the application when sensitive information is requested. For example, in a particular embodiment, the application can play a particular tone and/or display a notification on a screen on the user's phone when sensitive information is requested.

In one or more embodiments, the user enables the application to automatically run on their smartphone, or alternately choose to start up the application when desired at the appropriate time. In an embodiment, the user begins a call in order to request a product or service from another party such as insurance, a ticket purchase, or other products or services in which private and/or sensitive information may be required to be provided by the user. In particular embodiments, the other party may include a live agent at a call center or an automated call center agent.

In one or more embodiments, during the telephone conversation associated with the call, the application on the user's communication device listens to and/or monitors the telephone conversation between the caller and the agent associated with the product or service provider using, for example, voice to text conversion. In an embodiment, when the agent associated with the product of service provider verbally requests sensitive information from the caller, the request is recognized/detected by the application by performing the voice to text conversion and detecting when a keyword has been spoken. In particular embodiments, the application can cause a predetermined tone, such as a beep, to be produced by a speaker of the user's communication device or cause a display of the user's communication device to display a notification that sensitive information has been requested. In particular embodiments, the application causes the display of the user's communication device to display the sensitive information to be sent in case the user wishes to review the sensitive information to be sent and/or approve the sending of the sensitive information.

In one or more embodiments, the application sends the requested sensitive information to a client device associated with the other party, such as a call center agent of a service provider, in a text format. In particular embodiments, the sensitive information is encrypted prior to sending of the sensitive information and decrypted by the client device associated with the call center agent. Upon receiving the sensitive information in the text format, an application associated with the user agent the sensitive information may be displayed to the call agent, or alternately text to voice conversion occurs and the sensitive information is spoken to the call center agent as speech.

In one or more embodiments, the application associated with the user's communication device continuously listens to phone conversations and will automatically learn sensitive information and/or most frequently used information and stores it securely in a database in association with the user.

In particular embodiments, the sensitive information may be synchronized with other users who have been authorized by the user to receive such sensitive information. For example, the user may wish to share sensitive information with family members on a regular basis. Take, for example, a situation in which an elderly parent can no longer live on his or her own and decides to live with one of their children. In such a situation, it may be important to make sensitive information available to his or her care givers. In another example, family members may wish to share credit card information (e.g., number, expiration date or verification code) across family members such as parents sharing credit card information with their children while they are away at college. Instead of keeping this sensitive information written down somewhere, it may be desirable to have the sensitive information stored in an electronic secure format and kept up to date as appropriate through appropriate learning of new sensitive information. Accordingly, in some embodiments, selected sensitive information is synchronized between applications running on the respective user communication devices for users that have been authorized to receive the sensitive information.

In some embodiments, the sensitive information is sent to a server within a communication network and stored within a storage device instead of, or in addition to, being stored within the user's communication device. In particular embodiments, requested sensitive information is retrieved from the storage device by the server and sent to the requesting party instead of being sent by the application running on the user's communication device.

The illustrative embodiments are described with respect to certain types of sensitive information, formats or types of sensitive information, contents, transmissions, responses, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
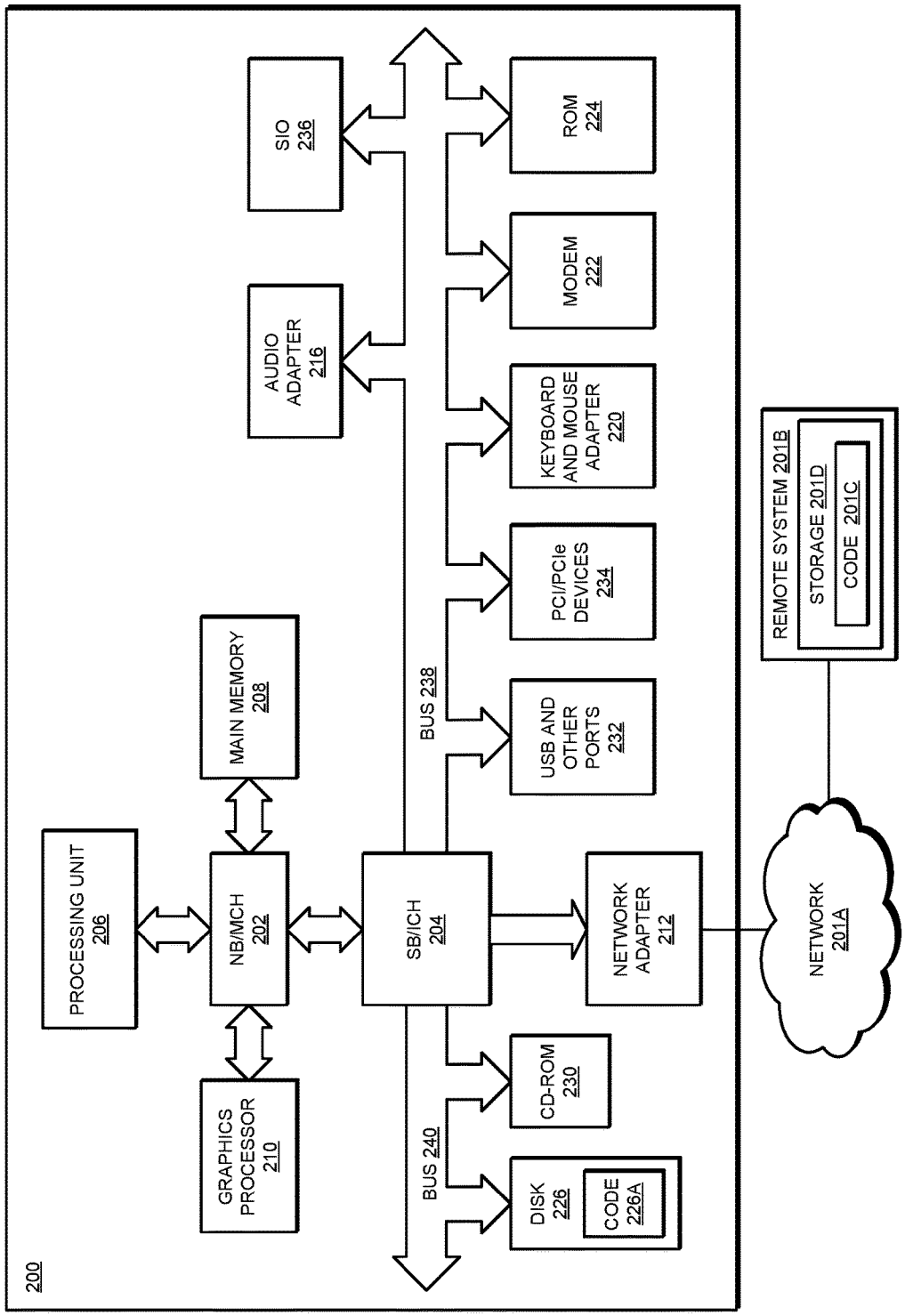
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon. In particular embodiments, one or more of client 110, 112, or 114 is associated with a call agent of a product or service provider and is configured to facilitate voice and/or text communication with a user associated with device 132. In particular embodiments, a telephone 136 is associated with the call agent and is configured to facilitate the call agent to have voice communication with the user during a call.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a user communication device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein in the manner of a remote server-based application or service. Application 105 may store sensitive information locally, or use storage unit 108 that is accessible over network 102 to store sensitive information in a secure manner within database 109. As another example, application 134 implements an embodiment described herein in the manner of a locally operating application or feature of device 132. In particular embodiments, application 134 stores sensitive information within a database in memory of device 132, may use a remote data storage such as storage 108 to store sensitive information, or may use some combination of local and remote storage within the scope of the illustrative embodiments.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 and 134 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
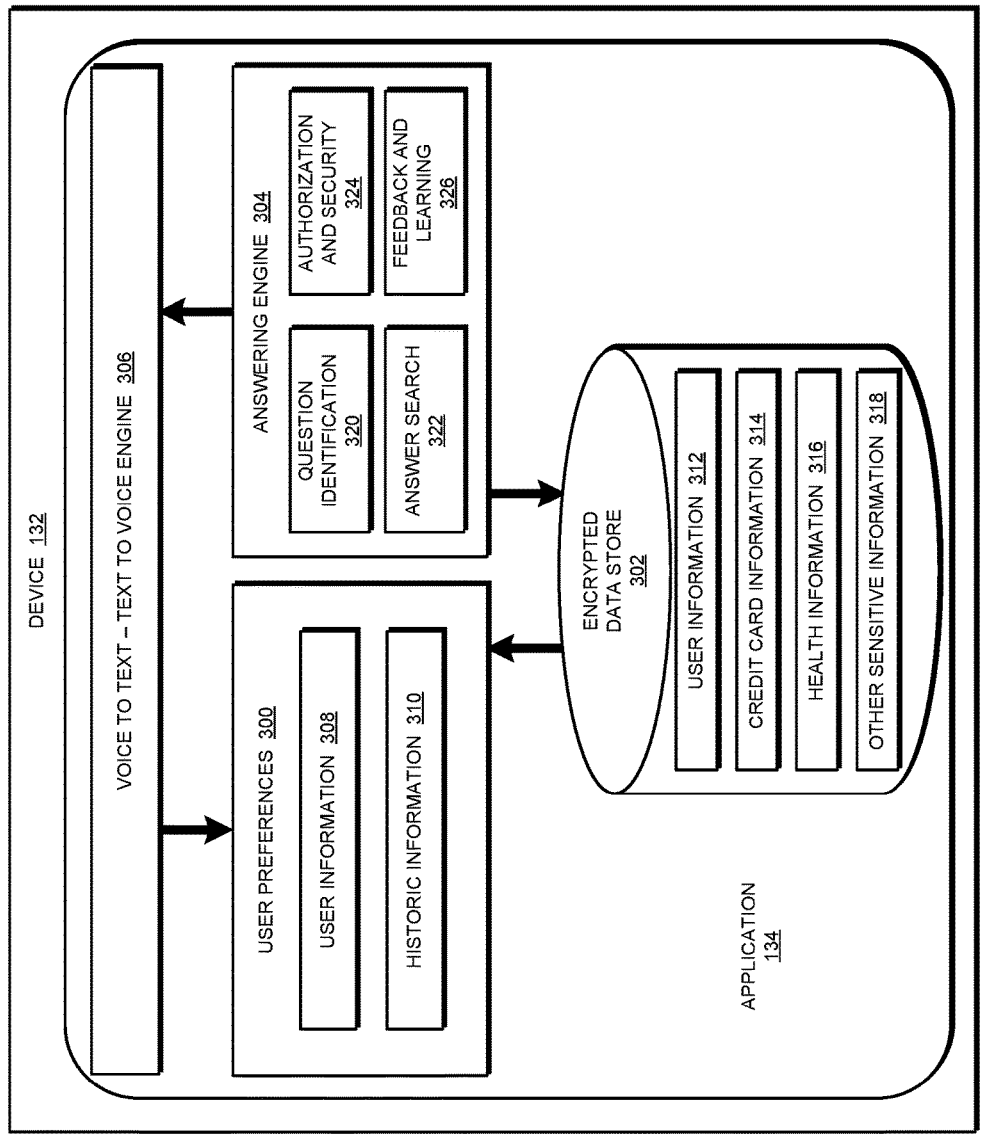
FIG. 3 depicts a block diagram of an example configuration of a device for managing sensitive information transfer between parties in a telephone conversation in accordance with an illustrative embodiment.

With reference to FIG. 3, this figure depicts a block diagram of an example configuration of a device for managing sensitive information transfer between parties in a telephone conversation in accordance with an illustrative embodiment. Application 134 is an example of application that executes in device 132 of FIG. 1. In particular embodiments, application 134 is an application that runs in the background of device 132 and acts as a digital repository based on user preferences in which sensitive information, such as personal data, credit card information, health insurance membership numbers, and other sorts of sensitive information is securely stored. In one or more embodiments, application 134 provides the sensitive information to a call agent during a subsequent call.

Application 134 includes a user preferences component 300, an encrypted data store component 302, an answering engine component 304 and a voice to text-text to voice engine component 306. User preferences component 300 is configured to allow a user to manage user preference information. In the embodiment illustrated in FIG. 3, user preference component 300 includes user information 308 and historic information 310. User information 308 includes user identity information as well as other configured user preferences such as phone numbers authorized to allow monitoring during a call associated with the phone number, particular keywords that are associated with sensitive information, and other users authorized to receive updates of sensitive information. Historic information 310 may include information associated with previous calls such as keywords associated with sensitive information previously provided during a call.

In an embodiment, encrypted store component 302 stores sensitive information in an encrypted from and may include, for example, user information 312, credit card information 314, health information 316, and other sensitive information 318. In particular embodiments, the sensitive information is stored in an encrypted text form.

In an embodiment, answering engine component 304 includes a question identification component 320, an answer search component 322, an authorization and security component 324, and a feedback and learning component 326. In at least one embodiment, question identification component 320 is configured to identify the particular piece of sensitive information that is being requested by a live agent. For example, the requested sensitive information may include a user's date of birth, a mother's maiden name, credit card information, health information, etc. In at least one embodiment, answer search component 322, responsive to question identification component 320 identifying the question and/or request, is configured to search encrypted data store 302 to find an answer that satisfies the question and/or request for sensitive information.

In an embodiment, authorization and security component 324 is configured to verify that the user has authorized the particular sensitive information to be provided to the other party, e.g., a live agent. In an embodiment, feedback and learning component 326 is configured to feedback and/or learn new sensitive information throughout a conversation. For example, if throughout the conversation feedback and learning component 326 identifies new questions that the user receives and is willing to answer, or identifies a change in an existing answer, answering engine 304 is configured to store and/or update the new sensitive information or updated sensitive information.

In one or more embodiments, voice-to-text-text-to-voice engine component 306 is configured to convert sensitive information identified during a conversion in voice form to text form for storage in encrypted data store. In particular embodiments, voice-to-text-text-to-voice engine component 306 is configured to convert sensitive information in text for to voice form for speaking to the other party during a phone conversation in situations in which encrypted transfer of sensitive information in text format is not available or desired.

Figure 4:
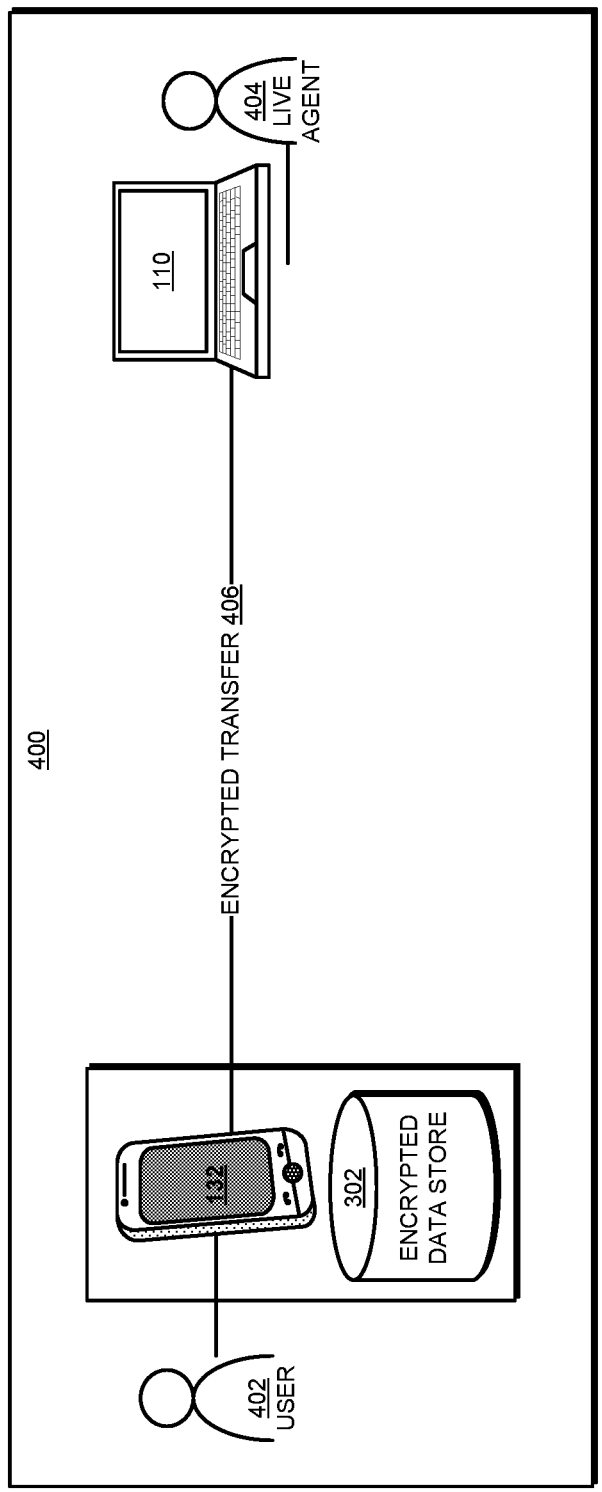
FIG. 4 depicts a block diagram of an example scenario for managing sensitive information transfer between parties in a telephone conversation in accordance with an illustrative embodiment.

With respect to FIG. 4, this figure depicts a block diagram of an example scenario for managing sensitive information transfer between parties in a telephone conversation in accordance with an illustrative embodiment. In the particular scenario illustrated in FIG. 4, a user 402 associated with device 132 wishes to provide sensitive information to a live agent 404 associated with a client device 110. In a particular embodiment, prior to contacting live agent 404, user 402 may first be located in a safe environment in which he doesn't mind providing sensitive information over the phone to a called party. In an embodiment, device 132 starts listening to the conversation between user 402 and the called party and stores the sensitive information in encrypted data store 302 for future availability. For example, if user 402 is located at home and is asked for credit card information by the called party, device 132 is listening to the conversation and identifies the credit card information using patterns specific to credit cards, such a credit card number and expiration date, and stores the credit card information in encrypted data store 302. In particular embodiments, device 132 may verify the sensitive information with existing data and store the sensitive information in encrypted data store 302 so that the sensitive information will be available in the future for use without the need for the user to manually enter the sensitive information into encrypted data store 302.

In one embodiment, at a subsequent time the user calls live agent 404. In the particular embodiment, client device 110 includes an application having the capability to receive encrypted communications from device 132. In a particular embodiment, device 132 causes a specific notification or alert such as a sound pattern, a beep, or a vibration to be produced by client device 110 to indicate to the live agent 404 that the calling part is capable of providing sensitive information as an encrypted transfer. In a particular embodiment, client device 110 can similarly cause a specific notification or alert to be produced by device 132. In one or more embodiments, device 132 begins monitoring the conversation and uses speech-to-text to understand the conversation. If live agent 404 requests sensitive information, device 132 detects the request, retrieves the sensitive information from encrypted data store 302 matching the request, and sends the requested sensitive information in text form to client device 110 as an encrypted transfer 406 over a secure channel. In one or more embodiments, device 132 and client device 110 handle authentication, interaction, and validation related to sending sensitive information with minimal or no human intervention.

Figure 5:
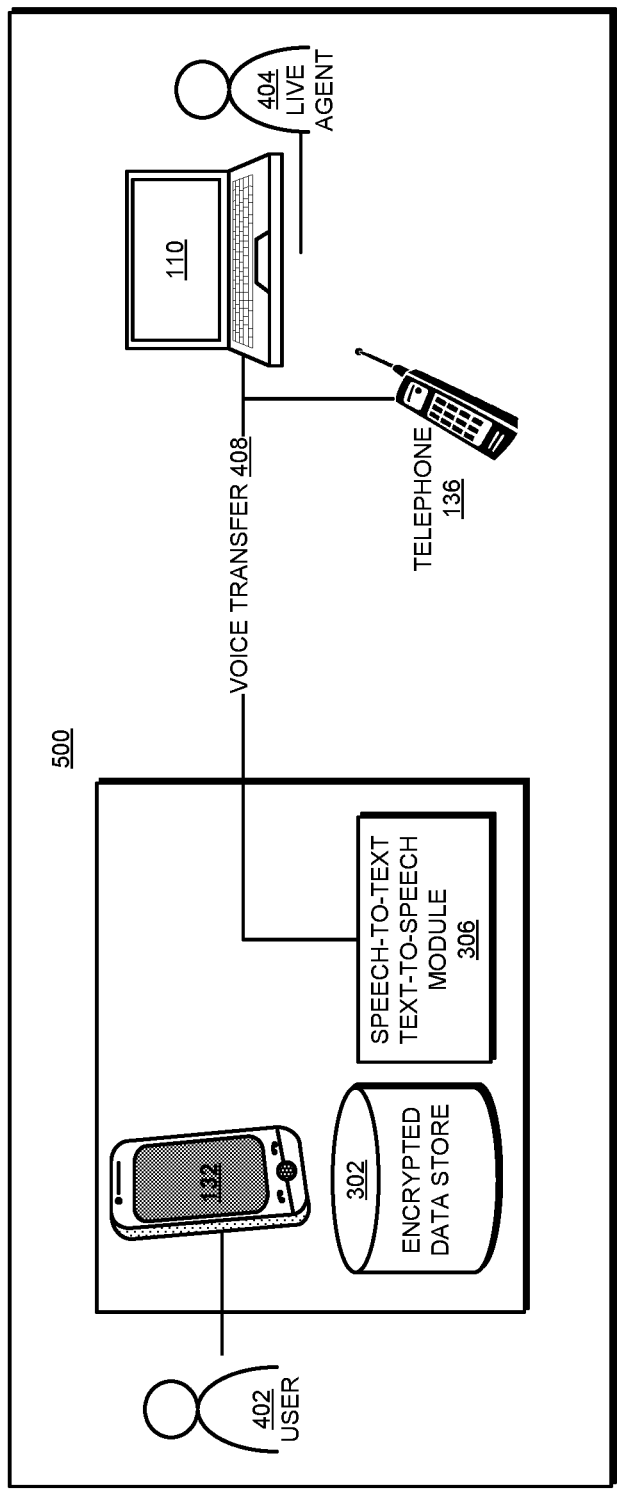
FIG. 5 depicts a block diagram of another example scenario for managing sensitive information transfer between parties in a telephone conversation in accordance with an illustrative embodiment.

With respect to FIG. 5, this figure depicts a block diagram of another example scenario for managing sensitive information transfer between parties in a telephone conversation in accordance with an illustrative embodiment. In the particular scenario illustrated in FIG. 5, user 402 associated with device 132 has previously stored sensitive information within encrypted data store 302 prior to contacting live agent 404. In one embodiment, at a subsequent time user 402 calls live agent 404. In the particular embodiment, client device 110 has a telephone 136 to allow voice communication with the user but does not have an application having the capability to receive encrypted communications from device 132.

In an embodiment, user 402 calls live agent 404 and device 132 begins monitoring the conversation and uses speech-to-text technology to identify when sensitive information is requested. Upon identifying a request for particular sensitive information, device 132 retrieves the sensitive information from encrypted data store 302. In one or more embodiments, device 132 converts the retrieved sensitive information from a text form to a voice form, takes control of the conversation, and sends the sensitive information to one or more of client device 110 and telephone 136 in a voice transfer 408. In a particular embodiment, the sensitive information is spoken to live agent 404 via telephone 136 during the conversation. In one or more embodiments, when device 132 is finished responding to the request for sensitive information, device 132 returns control of the conversation back to user 402 and enters the monitoring/listening mode again. In particular embodiments, if additional new questions are asked by live agent 404 and the questions are answered by user 402, device 132 detects these new questions and answers. In particular embodiments, when the call is completed device 132 inquires with user 402 regarding whether user 402 wishes to augment the sensitive information in encrypted data store 302 with the response to these new questions.

In another example scenario for managing sensitive information transfer between parties in a telephone conversation in accordance with an illustrative embodiment, user 402 receives an update to sensitive information, such as a new plan identification number for a health plan. In the particular embodiment, device 132 updates this sensitive information in the encrypted data store 302 contained in device 132. In the particular embodiment, user 402 has configured the user's user preferences to indicate that the user's spouse and two older children (which are away at college) are to have this health plan information synchronized to their respective devices. In the embodiment, device 132 sends the updated sensitive information to the devices associated with the other users so that, for example, the sensitive information is made available in a timely fashion when any of these family members have an appointment with a doctor or hospital.

Figure 6:
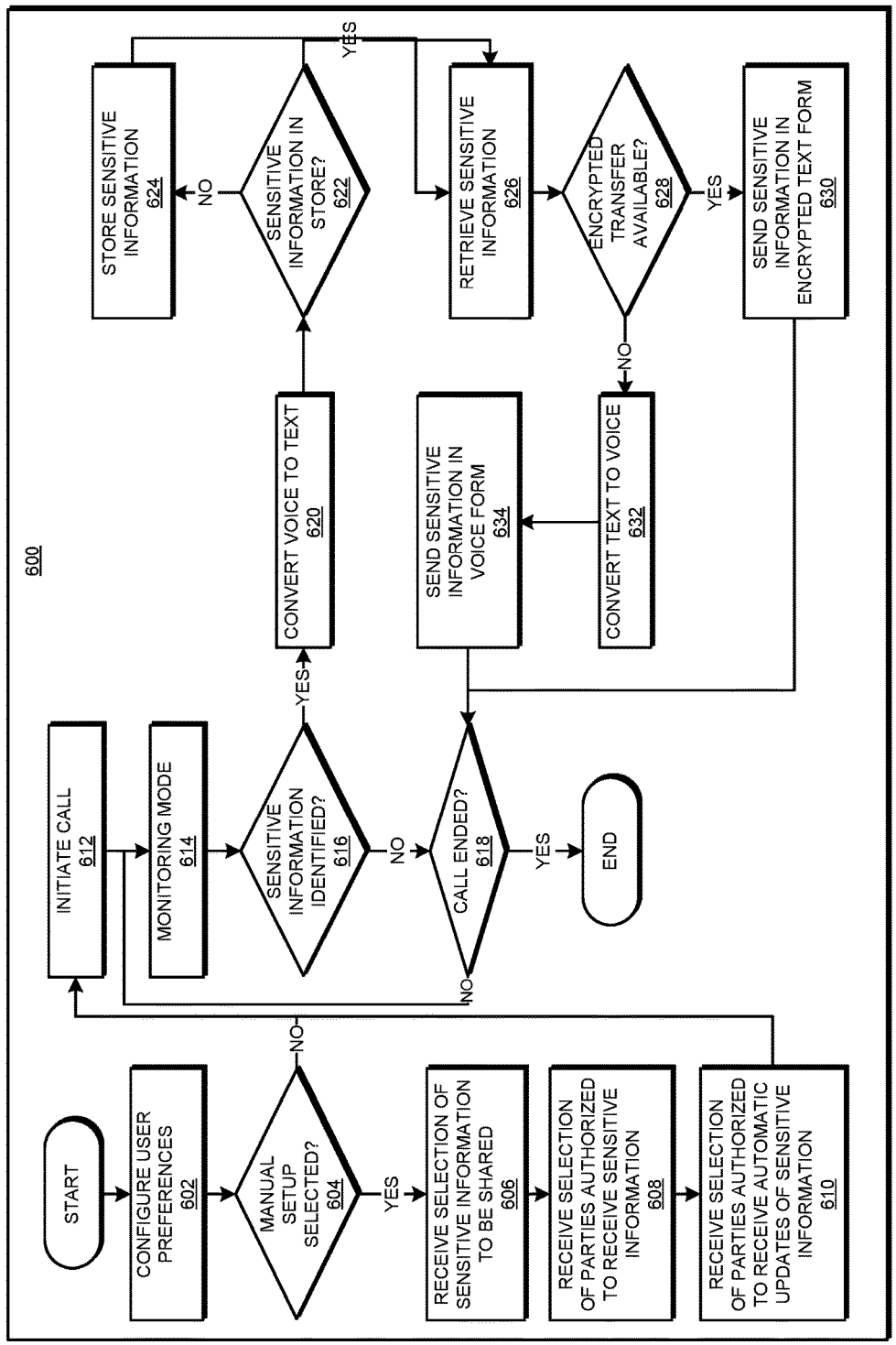
FIG. 6 depicts a flowchart of an example process for managing sensitive information transfer between parties in a telephone conversation in accordance with an illustrative embodiment.

With reference to FIG. 6, this figure depicts a flowchart of an example process for managing sensitive information transfer between parties in a telephone conversation in accordance with an illustrative embodiment. In accordance with various embodiments, process 600 can be implemented in application 134 or application 105 in FIG. 1.

In block 602, the application initiates configuring of user preferences for a user associated with device 132. In block 604, the application determines whether manual configuration or automatic configuration has been selected by the user. If manual setup is selected, in block 606 the application receives a selection from the user of sensitive information to be shared by the application. In particular embodiments, the selection of sensitive information may include a specification of particular sensitive information type that the user will allow to be shared during a conversation. In particular examples, sensitive information types may include credit card information, health history information, insurance plan information, or other sensitive information. In block 608, the application receives a selection from the user of parties authorized to receive sensitive information. In particular embodiments, the selection includes an indication of particular telephone numbers that are associated with parties authorized to receive sensitive information.

In block 608, the application receives a selection from the user of parties authorized to receive automatic updates of sensitive information. In particular embodiments, the parties authorized to receive updates may include family members of the user or other parties that the user wishes to receive updates of sensitive information. In block 610, the application receives a selection from the user of parties authorized to receive automatic updates of sensitive information and the process 600 continues to block 612. In addition, if in block 604 the application determines that manual setup is not selected the process continues to block 612.

In block 612, the user initiates a call with a called party, such as a call center agent, using device 132 to begin a conversation with the called party. In a particular embodiment, the user may select a contact or dial a phone number associated with the call center agent to initiate the phone call. In still other embodiments, device 132 may receive a call initiated by the call center agent.

In block 614, the application enters a monitoring mode in which the application listens for requests for sensitive information during the conversation. In block 616, the application determines whether a voice request for sensitive information has been spoken by the called party during the conversation. If sensitive information has not been identified, the process 600 continues to block 618 in which the application determines whether the call has ended. If the call has ended, the application ends process 600. If the call has not ended, the process 600 returns to block 614 in which the application continues within the monitoring mode.

If the application determines that sensitive information has been identified in block 616, process 600 continues to block 620. In block 620, the application converts the request sensitive information from a voice representation to a text representation. In block 622, the application determines whether the requested sensitive information matches sensitive information stored in the encrypted data store. In a particular embodiment, the application determines whether the sensitive information matches sensitive information stored in the encrypted data store by matching the text representation of the requested sensitive information to a text representation of the sensitive information stored in the encrypted data store. If the application determines that the requested sensitive information matches sensitive information in the encrypted data store, process 600 continues to 626. If the application determines that the requested sensitive information does not match sensitive information in the encrypted data store, the application stores the sensitive information in the encrypted data store in block 624 and process 600 continues to 626.

In 626, the application determines whether the called party is authorized to receive the sensitive information based upon user preferences and retrieves the matching sensitive information from the encrypted data store if the called party is authorized. In block 628, the application determines whether encrypted transfer is available with the called party. If the application determines that encrypted transfer is available, the application sends the sensitive information in encrypted text form to the called party in block 630. In particular embodiments, a client device associated with the called party is configured to decrypt the encrypted sensitive information and display the sensitive information to the called party. The process 600 then continues to block 618 in which the application determines whether the call has ended.

If the application determines in block 628 that encrypted transfer is not available, process 600 continues to 632 in which the application decrypts the sensitive information and converts the sensitive information from a text format to a voice format. In 634, the application sends the sensitive information in voice form to the called party and continues to block 618 in which the application determines whether the call has ended.

If the application determines in block 618 that the call has not ended, process 600 returns to block 614 in which the application continues to monitor the conversation for a request for sensitive information. If the application determines in block 618 that the call has ended, the application ends process 600 thereafter.

Although various embodiments describe the sensitive information as being stored in a text form, it should be understood that in other embodiments other types of sensitive information in other formats may be stored and provided to a requesting party. In a particular embodiment, the sensitive information provided to a requesting party may include audio data, biometric data, image data, or video data. For example, in particular embodiments the sensitive information may include a scanned image of a birth certificate, a medical x-ray image, or a scanned image of a driver's license.

In still another embodiment, the sensitive information may include instructions to cause an activity to occur. For example, in a particular embodiment, the sensitive information may include instructions for a machine or human to perform a task associated with the sensitive information such as fulfilling a prescription.

Thus, a computer implemented method, system or apparatus, and computer program product are provided in the illustrative embodiments for managing sensitive information transfer between parties in a telephone conversation and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
    monitoring, by a communication device associated with a first party, a voice call between the first party and a second party;
    detecting, by causing a processor in the communication device to analyze voice data of the voice call, that a keyword has been spoken in the voice call;
    sensing, by the communication device, that textual data corresponding to the keyword represents a request by the second party for a sensitive information of the first party, wherein the sensitive information forms a requested sensitive information;
    identifying, by the communication device, the requested sensitive information;
    determining whether the requested sensitive information matches sensitive information stored in an encrypted data store by determining whether a text representation of the requested sensitive information matches a text representation of the sensitive information stored in the encrypted data store; and
    sending by the communication device, responsive to determining that the requested for sensitive information matches the stored sensitive information, the requested sensitive information to the second party.

2. The method of claim 1, further comprising:
    determining whether the second party is authorized to receive the sensitive information based upon user preference information associated with the first party, wherein sending the requested sensitive information is further responsive to determining that the second party is authorized to receive the sensitive information.

3. The method of claim 1, wherein the identifying of the requested sensitive information includes identifying the request using natural language processing.

4. The method of claim 1, wherein the identifying of the requested sensitive information includes converting the request from a voice form to a text form.

5. The method of claim 1, further comprising:
    encrypting the requested sensitive information; and
    sending the encrypted sensitive information to the second party.

6. The method of claim 1, further comprising:
    converting the requested sensitive information from a text form to a voice form; and
    sending the requested sensitive information to the second party in the voice form.

7. The method of claim 1, further comprising:
    receiving sensitive information in a voice form from the first party; and
    storing the sensitive information in the encrypted data store.

8. The method of claim 1, further comprising:
    receiving a selection of a type of sensitive information to be shared; and
    storing the selection of the type of sensitive information in the user preference information.

9. The method of claim 1, further comprising:
    receiving a selection of a party authorized to receive sensitive information; and
    storing the selection of the authorized party in the user preference information.

10. The method of claim 1, further comprising:
    receiving a selection of a party authorized to receive updates of sensitive information; and
    sending updated sensitive information to the authorized party responsive to receiving an update of the sensitive information.

11. The method of claim 1, wherein the request for sensitive information includes a voice request.

12. The method of claim 1, wherein the requested sensitive information includes one or more of text data, voice data, image data, and video data.

13. A computer usable program product comprising one or more computer-readable storage devices, and program instructions stored on at least one of the one or more storage devices, the stored program instructions comprising:
    program instructions to monitor, by a communication device associated with a first party, a voice call between the first party and a second party;
    program instructions to detect, by causing a processor in the communication device to analyze voice data of the voice call, that a keyword has been spoken in the voice call;
    program instructions to sense, by the communication device, that textual data corresponding to the keyword represents a request by the second party for a sensitive information of the first party, wherein the sensitive information forms a requested sensitive information;
    program instructions to identify, by the communication device, the requested sensitive information;
    program instructions to determine whether the requested sensitive information matches sensitive information stored in an encrypted data store by determining whether a text representation of the requested sensitive information matches a text representation of the sensitive information stored in the encrypted data store; and
    program instructions to send by the communication device, responsive to determining that the requested for sensitive information matches the stored sensitive information, the requested sensitive information to the second party.

14. The computer usable program product of claim 13, further comprising:
    program instructions to determine whether the second party is authorized to receive the sensitive information based upon user preference information associated with the first party, wherein sending the requested sensitive information is further responsive to determining that the second party is authorized to receive the sensitive information.

15. The computer usable program product of claim 13, program instructions to encrypt the requested sensitive information; and program instructions to send the encrypted sensitive information to the second party.

16. The computer usable program product of claim 13, further comprising:
program instructions to convert the requested sensitive information from a text form to a voice form; and
program instructions to send the requested sensitive information to the second party in the voice form.

17. The computer usable program product of claim 13, further comprising:
program instructions to receive sensitive information in a voice form from the first party; and
program instructions to store the sensitive information in the encrypted data store.

18. The computer usable program product of claim 13, wherein the computer usable code is stored in a computer readable storage device in a data processing system, and wherein the computer usable code is transferred over a network from a remote data processing system.

19. The computer usable program product of claim 13, wherein the computer usable code is stored in a computer readable storage device in a server data processing system, and wherein the computer usable code is downloaded over a network to a remote data processing system for use in a computer readable storage device associated with the remote data processing system.

20. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
program instructions to monitor, by a communication device associated with a first party, a voice call between the first party and a second party;
program instructions to detect, by causing the one or more processors in the communication device to analyze voice data of the voice call, that a keyword has been spoken in the voice call;
program instructions to sense, by the communication device, that textual data corresponding to the keyword represents a request by the second party for a sensitive information of the first party, wherein the sensitive information forms a requested sensitive information;
program instructions to identify, by the communication device, the requested sensitive information;
program instructions to determine whether the requested sensitive information matches sensitive information stored in an encrypted data store by determining whether a text representation of the requested sensitive information matches a text representation of the sensitive information stored in the encrypted data store; and
program instructions to send by the communication device, responsive to determining that the requested for sensitive information matches the stored sensitive information, the requested sensitive information to the second party.

\* \* \* \* \*